Jan. 30, 1940. W. R. UHLEMANN 2,188,380
LENS MOUNTING
Filed March 21, 1938
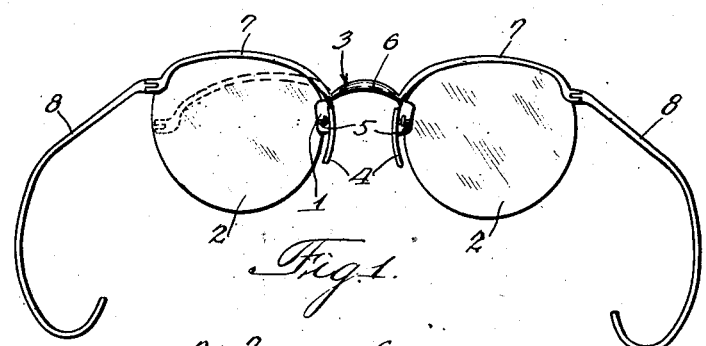
Fig. 1.
Fig. 2.
Fig. 3.
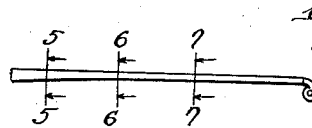
Fig. 4.
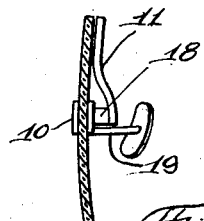
Fig. 13.
Fig. 8.
Fig. 9.
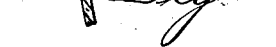
Fig. 5. Fig. 6. Fig. 7.
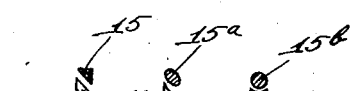
Fig. 10. Fig. 11. Fig. 12.
Inventor
William R. Uhlemann
By Amis, Rhius, Olsen & Mecklenburger
Attys.

_Patented Jan. 30, 1940_

2,188,380

UNITED STATES PATENT OFFICE 2,188,380

LENS MOUNTING

William R. Uhlemann, Evanston, Ill., assignor to Uhlemann Optical Co. of Illinois, Chicago, Ill., a corporation of Delaware Application March 21, 1938, Serial No. 197,113

1 Claim. (Cl. 88—47)

This invention relates to eyeglasses and more particularly to a mounting providing a rimless support for the lens, and temple supporting portions which may substantially conform to the upper contour of the lens and which may be positioned at the rear of the lens and substantially follow the contour of the outer edge thereof, whereby there will be a minimum restriction of vision by the mounting.

A further object is to provide such a construction in which the various elements are so proportioned and related as to provide a desirable resiliency in certain portions combined with a rigidity of other parts where stiffness is required and in which the structural details are so related that the bridge and lens supporting portion will maintain the desired alignment without restriction of flexibility in the temples and temple mounting.

A further object is the provision of a particularly attractive type of mounting for lenses and temples in which the resilient temple mounting arms may substantially conform in cross section to the edge contour of the lens whereby the temple mountings will be inconspicuous and will not materially interfere with vision through the lens.

A further object is the provision of a lens and temple mounting which will be cheap to manufacture, easy to assemble, and which will not easily get out of order in use.

Further objects will be apparent from the specification and the appended claim.

In the drawing,

Fig. 1 is a rear view of a pair of spectacles and illustrates one embodiment of the invention.

Fig. 2 is a top view of the embodiment illustrated in Fig. 1.

Fig. 3 is a perspective view of another embodiment in which the bridge and temple supporting arms are formed of separate pieces which may then be brazed or otherwise secured together to form an integral mounting.

Fig. 4 is a top view of one of the temple supporting arms and illustrates the tapered contour.

Fig. 5 is a transverse section through the embodiment illustrated in Fig. 4 and taken on a line substantially corresponding to line 5—5 of Fig. 4.

Fig. 6 is a transverse section similar to Fig. 5, but taken on a line corresponding to line 6—6 of Fig. 4.

Fig. 7 is a sectional view similar to Figs. 5 and 6, but taken on a line corresponding to line 7—7 of Fig. 4.

Fig. 8 is a top view illustrating a slightly different form of tapered temple arm.

Fig. 9 is a top view and illustrates a slightly modified form of temple supporting arm constructed to provide maximum resilience adjacent the center of the arm.

Fig. 10 is a transverse sectional view through a lens and temple arm wherein the transverse contour of the temple mounting conforms substantially to the edge contour of the lens.

Fig. 11 illustrates another embodiment wherein the edge of the lens and the lens mounting have complemental contours.

Fig. 12 is somewhat similar to Figs. 10 and 11, but illustrates a temple mounting arm of circular cross sectional contour conforming to the arcuate edge of the lens.

Fig. 13 illustrates one method of assembling a mounting similar to that illustrated in Fig. 3.

Referring to the drawings in detail, the embodiment illustrated in Figs. 1 and 2 comprises a pair of channel-like straps 1, each having a lens edge-engaging portion with ears extending therefrom for embracing the sides of the lenses 2, and an integral bridge and temple supporting member 3. Nose guards 4 are supported on the straps 1 by means of suitably shaped arms 5, which arms may be brazed or otherwise secured to the straps.

The integral bridge and temple supporting member 3 comprises a suitably shaped bridge 6 and outwardly extending arcuate arms 7 to which suitable temple members 8 may be pivotally mounted in the usual manner. The arms 7 preferably conform substantially to the longitudinal contour of the upper edge of the lens and these arms are preferably positioned immediately at the rear of the lens as shown in Fig. 2. The straps 1 may be brazed or soldered or otherwise suitably secured to the member 3 to support the lenses and nose guards in desired alignment.

The bridge 6 may be substantially rigid in order to retain the lenses and nose guards in predetermined relative position, and the temple supporting arms 7 are preferably tapered as illustrated in Figs. 1 and 4. That is, the portion of the arm nearest the strap 1 is comparatively thick in cross section and may be of a cross sectional contour similar to that shown in Fig. 5. The arms may taper gradually over their entire length or may taper gradually to substantially the center line of the lens and from that point to the temple bearing may be of comparatively small substantially uniform cross sectional contour in order to provide a resiliency throughout the outer portion of the arm while retaining the inner portion comparatively rigid. By this construction the resiliency of the arms 7 is distributed over the length in such a manner that the central portion of the integral structure is substantially rigid while providing increased resiliency toward the temples. The arms are preferably snugly adjacent the lens as shown in Fig. 2, and as the inner ends of the arms are comparatively rigid, the rigid portions retain the lenses in alignment even when the outer ends of the arms are sprung downwardly or rearwardly as shown by dotted lines in Figs. 1 and 3, respectively.

The cross sectional contour of the temple supporting arms 7 adjacent the bridge is preferably oval or elliptical as shown in Fig. 5, and the arms gradually decrease in cross section toward the middle of the lens. The outer portion of the arm may be substantially round in cross section as shown in Fig. 7.

Fig. 4 illustrates a top view of one of the arms with the longitudinal curvature such as to conform to the contour of the side of the lens adjacent the edge. The longitudinal shape of the arm may be varied as desired to conform to any suitable lens curvature.

Fig. 8 illustrates a type of arm adapted to conform to still another face contour of lens. It will be understood that the arm may be spaced from the lens over a portion of its length or over its entire length if desired.

Fig. 9 illustrates still another embodiment in which the arm is comparatively thick at each end and of smaller cross section adjacent the middle so that the greatest resilience is provided adjacent the center of the arm and the arm is comparatively rigid adjacent the temple as shown at 8a.

Fig. 3 illustrates an embodiment of the invention in which the bridge and temple supporting arms are not formed integrally, but instead are separately formed and may be secured together as illustrated by brazing or otherwise. In this construction a bridge member 9 is suitably formed and straps 10 are secured to the ends thereof or may be integral therewith. The temple supporting arms 11 may be longitudinally tapered in the same manner as previously described and their inner ends may be elongated as shown to provide downwardly and rearwardly extending guard-supporting arms 12 to which the guards 13 may be secured. In this embodiment the guard arms 12 may be integral with the temple supports 11 or may be separate arms which may be brazed thereto or to the straps 10 as desired.

In some cases it is desirable to form the edge of the lens 2 angularly as shown at 14 in Fig. 10. In such cases the cross sectional contour of the temple supporting arms 15 may conform with the angular edge of the lens and these arms may be substantially triangular in cross section and may taper longitudinally substantially as previously described.

Fig. 11 illustrates a somewhat different contour for the edge of the lens as shown at 16, and the arm in this case may be oval or arcuate in cross section as shown at 15a.

Fig. 12 illustrates still another embodiment in which the arm 15b is round in cross section to conform with the arcuate curvature 17 of the edge of the lens 2. All of the embodiments may be longitudinally tapered as previously described.

In the embodiment illustrated in Figs. 10, 11 and 12, the arms may be substantially in the plane of the lens instead of at the rear, thereby providing full vision through the entire lens.

Fig. 13 illustrates a slightly different method of securing temple supporting arms 11 to the straps 10. In this embodiment a block or other suitable member 18, which may be an end of the bridge, is secured to the strap 10 by brazing or otherwise, or may be integral therewith. An arm 19 is provided for supporting the nose guard and is shown secured to the strap 10. This arm 19 may be secured to the block 18, if desired, or may be integral with either the strap or the block 18. In this construction the separate arms 11 are brazed or otherwise secured to the block 18 as illustrated. This provides an exceptionally rigid bridge and guard supporting assembly and lens mounting, and the tapered arm may be shaped somewhat as illustrated to bring the outwardly extending portion of the arm adjacent the lens as shown.

The embodiments herein illustrated and described provide a structure in which the lenses will effectively be maintained in alignment, with sufficient resilience and flexibility in the temple mountings to maintain the spectacles in position without discomfort to the wearer.

It will be understood that the term "lens supporting straps" is intended to cover any proper range of equivalents; that is, any suitable means for securing the lens to the mounting.

Modifications may be made without departing from the spirit of the invention, and it is, therefore, desired that the invention be limited only by the prior art and the scope of the appended claim.

Where the word "lens" is used, it is to be understood that it is immaterial whether the lens be of the rim type shown in Fig. 10 or of the rimless type shown in Fig. 2 of my Patent No. 2,108,875.

Having thus described this invention, what is claimed and desired to be secured by Letters Patent is:

An ophthalmic mounting comprising a central bridge portion, a temple, and a temple-supporting wire having one end rigidly secured to the remainder of the mounting adjacent the bridge portion and having a free portion extending from said secured end following the contour of the upper edge of the lens to a temple hinge on the temple side of the lens, said temple-supporting wire tapering gradually from its secured end to the temple side of the lens to gradually increase the springiness of the wire.

WILLIAM R. UHLEMANN.